April 24, 1934.  H. C. DRAKE  1,955,953
FLAW DETECTOR CAR
Filed Jan. 9, 1932
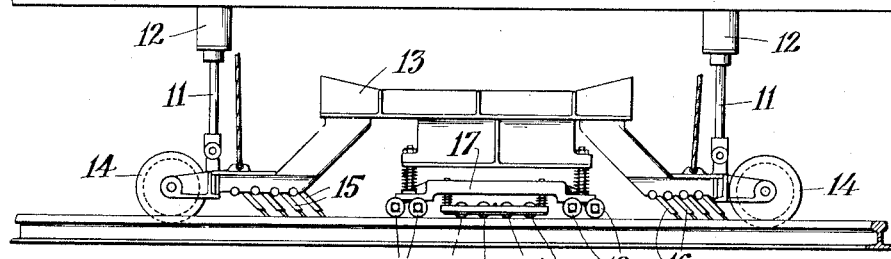
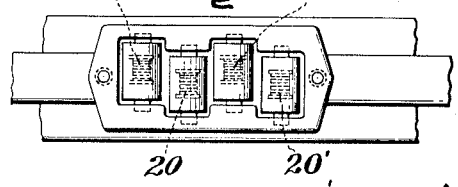
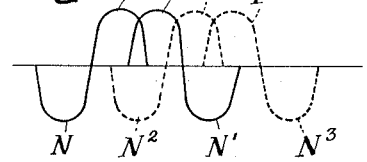
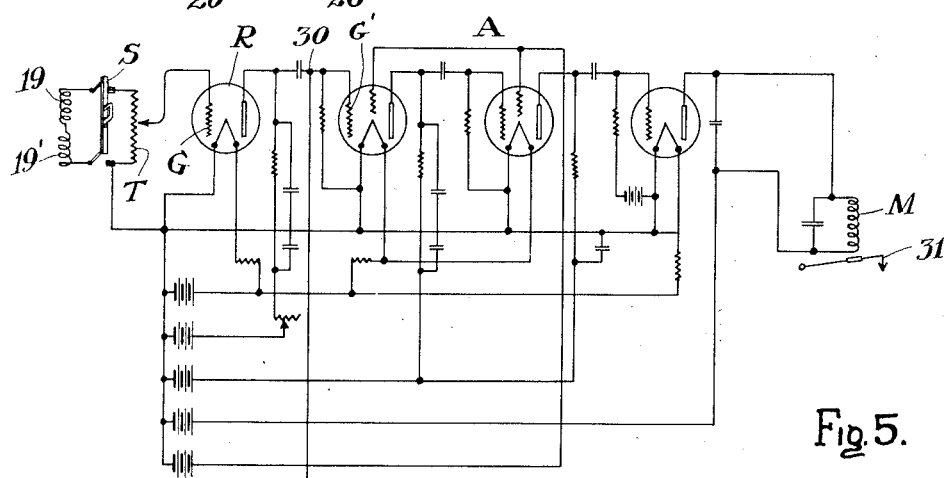
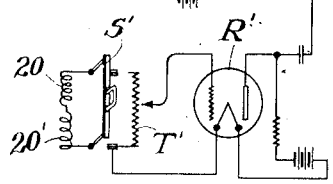
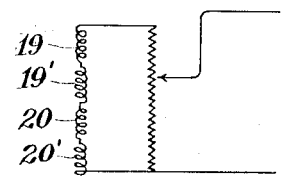
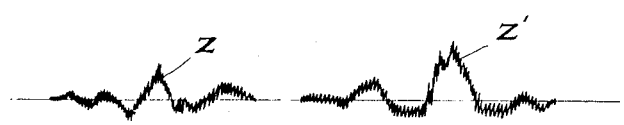
INVENTOR
Harcourt C. Drake
BY Joseph H. Lipschutz
ATTORNEY Patented Apr. 24, 1934

1,955,953

UNITED STATES PATENT OFFICE 1,955,953

FLAW DETECTOR CAR

Harcourt C. Drake, Hempstead, N. Y., assignor to Sperry Products, Inc., Brooklyn, N. Y., a corporation of New York Application January 9, 1932, Serial No. 585,662

14 Claims. (Cl. 175—183)

This invention relates to flaw detector mechanisms and particularly to the type of rail flaw detector mechanism utilized in the Sperry detector cars and described in my co-pending application Serial No. 542,531, filed June 6, 1931.

As is well known, the Sperry detector operates on the principle of sending a heavy current through an electrical conductor, in this case a rail, and causing a pair of opposed induction coils to travel through the electro-magnetic field thus established so that when a flaw is encountered a differential E. M. F. is generated and said differential E. M. F. is then amplified by a thermionic amplifier to cause operation of an indicator or recorder.

In my said co-pending application, I disclosed a modified form of detector unit in which two pairs of opposed coils are employed instead of one, said pairs being staggered so as to cooperate with the respective sides of the rail head. The sets of coils were so arranged that the output of the second pair was designed to reinforce the output of the first pair of coils when a flaw was encountered.

The present invention has for its principal object the provision of means whereby the useful output from a detector unit employing a plurality of pairs of coils is materially increased to give a more sensitive detection, and hence to detect internal flaws more readily.

Another important object of my invention is the provision of the method of and means for utilizing the detector coils at one side or the other of the rail as desired or as determined by circumstances. Thus, for example, on certain curved tracks there is formed on the outer edge of the track, shell or corrugations which would ordinarily give a plurality of indications like those due to internal flaws. By my invention I am enabled to cut out those detector coils which would ordinarily cooperate with such portion of the track and thus avoid one or more false indications which would delay testing.

Other objects and advantages of this invention will become apparent in the following detailed description thereof.

In the accompanying drawing,

Fig. 1 is a side elevation of a portion of a Sperry detector car showing a rail flaw detector mechanism suspended therefrom in operative position in engagement with the rail.

Fig. 2 is a plan view of the detector unit employed in the Fig. 1 form of detector mechanism.

Fig. 3 is a graph illustrating the theory underlying my invention.

Fig. 4 is a wiring diagram embodying my invention.

Fig. 5 is a wiring diagram of a form of connection illustrating the defect which my invention seeks to overcome.

Figs. 6 and 7 are oscillographs of the output of an amplifier illustrating the results accomplished by my invention.

Referring to Fig. 1 of the drawing, there is illustrated the usual structure of the Sperry rail flaw detector mechanism. This mechanism is suspended from beneath a car body 10 by means of piston rods 11 extending out of fluid pressure cylinders 12, the said piston rods supporting a current brush carriage 13 which rides on the rails, in lowered or operative position, on wheels 14. Said current brush carriage is provided with inlet and outlet current brushes 15, 16 adapted to conduct current supplied by a generator, not shown, within the car body into and out of the rail. Supported on said current brush carriage for independent movement is the detector carriage 17 which rides on the rail on rollers 18 and supports the detector coils 19, 19' and 20, 20'.

By reference to Fig. 2 it will be seen that these coils comprising two pairs, each pair connected in opposition, (see Fig. 4), are arranged in staggered relation as described in my co-pending application, Ser. No. 542,531. It will be seen that the pair 19, 19' coact principally with one side of the rail head while the pair 20, 20' coact principally with the other side. The advantages of such an arrangement are fully described in my co-pending application. Also, the coils of pair 20, 20' alternate with the respective coils of pair 19, 19' in order that the useful output of the second pair may come in at a point where it will reinforce the output of the first pair.

By referring to Fig. 3 it will be seen that when a flaw is encountered the coil 19 will be the first to enter the changing field caused by such flaw and will be the first to leave it. Thus, there will be generated, e. g., a negative impulse N and a positive impulse P. The coil 19' on entering the region of the flaw will generate a positive impulse P' and then a negative impulse N' because said coil 19' is oppositely wound to that of coil 19. The coil 20 will generate a negative impulse $N^2$ and the positive impulse $P^2$, while coil 20' will generate a positive impulse $P^3$ and a negative impulse $N^3$. The coils of each pair are so arranged that the positive impulses such as P, P' overlap so as to make a fairly continuous output of that pair of coils, as disclosed in my copending application Ser. No. 583,854, filed Dec. 30, 1931. The arrangement of the two pairs of coils relative to each other as shown in Fig. 2 is for the purpose of causing positive impulses P², P³ caused by the set of coils 20, 20' to be substantially additive to that of P, P'. Thus it will be seen that the four positive impulses P, P', P², P³ are substantially continuous.

In the arrangement of coils heretofore described it will be seen by reference to the graph, Fig. 3, that certain negative impulses such as N², N' counterbalance, and, in fact tend to wipe out part of the corresponding positive impulses P, P', P², P³. Thus, the resultant useful and positive output which goes into the amplifier is substantially reduced and therefore the maximum useful output is not obtained. By my invention I eliminate the counteracting impulses and thus obtain the full value of the useful impulses which cause a much stronger indication of flaws and will be much more effective in detecting flaws, especially very minute flaws. In a word, a more sensitive detector is obtained which makes it possible, if desired, to run the amplifier with less sensitivity and still obtain the same detecting power as heretofore, the lessened sensitivity of the amplifier resulting in fewer false indications not due to flaws.

For the purpose of accomplishing the result described in the preceding paragraph, I have provided the method and mechanism disclosed in Fig. 4. By referring to this figure it will be seen that the output of the pair of coils 19, 19' is passed through a rectifier R and thence through an amplifier A, which may be of the resistance-coupled type, and the output of said amplifier may be caused to operate an indicator, such as, for example, the recorder comprising the pen 31 which is operated by magnet M adapted to be energized by the output of said amplifier. If the two pairs of coils 19, 19' and 20, 20' were arranged in series as shown in Fig. 5, there would be obtained the condition illustrated in Fig. 3 wherein the negative impulses from certain of the coils would counteract the positive impulses from certain other of the coils to reduce the voltage impressed upon the grid G of the first tube R. By my invention, however, I provide a separate rectifier for each pair of coils as shown; the set of coils 20, 20' being connected to a rectifier R' in the same manner that the coils 19, 19' are connected to rectifier R. The output from both rectifiers is then added together at point 30 to be impressed upon the grid G' of the first tube of amplifier A. It will now be seen that by this arrangement whereby I have separated the two pairs of coils, I have prevented the counteracting impulses (in the case shown—negative impulses) from one pair nullifying wholly or partly the useful impulses (in the case shown,—positive impulses) of the other pair. Only after the output of each pair has been rectified to eliminate the counteracting impulses so that said impulses can no longer exert a detrimental effect on the useful impulses are these impulses added together at connection 30.

Figures 6 and 7 are actual oscillographs illustrating the beneficient result that followed the method and construction shown in Fig. 4. The oscillograph of Fig. 6 shows a useful output Z of the amplifier A when the coils of the two pairs were connected as shown in Fig. 5. Fig. 7 shows an output Z' of the amplifier with an arrangement shown in Fig. 4 where the output of each pair of coils was separately rectified and the output of the rectifiers added together. It will be seen that the output Z' is not only of greater intensity, but of longer duration, thus indicating vastly superior results as flowing from my invention as hereinbefore described.

With the arrangement of coils as in Fig. 3 the positive impulses are continuous and the above description has therefore concerned itself with substantially eliminating the negative impulses. By reversing the coils the negative impulses could be made continuous and in that case the positive impulses would be substantially eliminated by the rectifier means.

In the introductory remarks to this specification I have stated that conditions arise which make it desirable to test principally one side or the other side of the rail in order to avoid a multiplicity of false indications which delay testing and make it difficult to distinguish an indication due to a flaw from false indications due to mere surface irregularities. I have provided means whereby I can at will throw out the coils at one side or the other. This means may take the form of switches S, S' placed across the potentiometers T, T' which form the connections between the coils and the thermionic device. So that by merely opening switch S or switch S' I may cause one pair or the other to test alone and thus test mainly one side or the other side of the track.

In accordance with the provisions of the patent statutes I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flaw detector mechanism for electrical conductors, means for establishing an electromagnetic field around the conductor, a plurality of detector coils adapted to be moved over said conductor whereby each coil generates a positive-type impulse and a negative-type impulse on passing through a region of flaw, said coils being so positioned relative to each other that certain of said impulses of one type tend to counteract certain of said impulses of the other type, an indicator adapted to be actuated by said impulses, and means whereby only one of said impulse types actuates said indicator.

2. In a flaw detector mechanism for electrical conductors, means for establishing an electromagnetic field around the conductor, a plurality of detector coils adapted to be moved over said conductor whereby each coil generates a positive-type impulse and a negative-type impulse on passing through a region of flaw, said coils being so positioned relative to each other that certain of said impulses of one type tend to counteract certain of said impulses of the other type, an indicator adapted to be actuated by said impulses, and means whereby one of said impulse types is eliminated before reaching said indicator.

3. In a flaw detector mechanism for electrical conductors, means for establishing an electromagnetic field around the conductor, a plurality of detector coils adapted to be moved over said conductor whereby each coil generates a positive-type impulse and a negative-type impulse on passing through a region of flaw, said coils being so positioned relative to each other that certain of said impulses of one type tend to counteract certain of said impulses of the other type, an indicator adapted to be actuated by said impulses, and means whereby said impulses are rectified so that only one of said impulse types actuates said indicator.

4. In a flaw detector mechanism for electrical conductors, means for establishing an electromagnetic field around the conductor, a plurality of pairs of detector coils adapted to be moved over said conductor whereby each coil generates a positive-type impulse and a negative-type impulse on passing through a region of flaw, said coils being so positioned relative to each other that certain of said impulses of one type tend to counteract certain of said impulses of the other type, an indicator adapted to be actuated by said impulses, and means whereby only one of said impulse types actuates said indicator.

5. In a flaw detector mechanism for electrical conductors, means for establishing an electromagnetic field around the conductor, a plurality of pairs of detector coils adapted to be moved over said conductor whereby each coil generates a positive-type impulse and a negative-type impulse on passing through a region of flaw, an indicator adapted to be actuated by said impulses, said coils being arranged so that all of the impulses of one of said types are substantially continuous, and means whereby only said last-named impulse type actuates said indicator.

6. In a flaw detector mechanism for electrical conductors, means for establishing an electromagnetic field around the conductor, a plurality of pairs of detector coils adapted to be moved over said conductor whereby each coil generates a positive-type impulse and a negative-type impulse on passing through a region of flaw, an indicator adapted to be actuated by said impulses, said coils being arranged so that all of the impulses of one of said types are substantally continuous, and means whereby the other of said impulse types is eliminated before reaching said indicator.

7. In a flaw detector mechanism for electrical conductors, means for establishing an electromagnetic field around the conductor, a plurality of pairs of detector coils adapted to be moved over said conductor whereby each coil generates a positive-type impulse and a negative-type impulse on passing through a region of flaw, an indicator adapted to be actuated by said impulses, said coils being arranged so that all of the impulses of one of said types are substantially continuous, and rectifying means whereby the other of said impulse types is eliminated before reaching said indicator.

8. In a flaw detector mechanism for electrical conductors, means for establishing an electromagnetic field around the conductor, a plurality of pairs of detector coils adapted to be moved over said conductor whereby each coil generates a positive-type impulse and a negative-type impulse on passing through a region of flaw, an indicator adapted to be actuated by said impulses, and means for independently rectifying the impulses of each pair of coils for eliminating one of said impulse types.

9. In a flaw detector mechanism for electrical conductors, means for establishing an electromagnetic field around the conductor, a plurality of pairs of detector coils adapted to be moved over said conductor whereby each coil generates a positive-type impulse and a negative-type impulse on passing through a region of flaw, an indicator adapted to be actuated by said impulses, means for independently rectifying the impulses of each pair of coils for eliminating one of said impulse types, and means whereby the rectified output from said pairs of coils are added together before reaching said indicator.

10. In a flaw detector mechanism for electrical conductors, means for establishing an electromagnetic field around the conductor, a plurality of pairs of detector coils adapted to be moved over said conductor whereby each coil generates a positive-type impulse and a negative-type impulse on passing through a region of flaw, an indicator adapted to be actuated by said impulses, said coils being arranged so that all of the impulses of one of said types are substantially continuous, means for independently rectifying the impulses of each pair of coils for eliminating one of said impulse types, and means whereby the rectified output from said pairs of coils are added together before reaching said indicator.

11. In a flaw detector mechanism for electrical conductors, means for establishing an electromagnetic field around the conductor, a plurality of pairs of detector coils adapted to be moved over said conductor, said pairs of coils being arranged in staggered relation to coact with various portions of said conductor, and means whereby said pairs of coils are selectively rendered effective and ineffective.

12. In a flaw detector mechanism for electrical conductors, means for establishing an electromagnetic field around the conductor, a plurality of pairs of detector coils adapted to be moved over said conductor, said pairs of coils being arranged in staggered relation to coact with various portions of said conductor, and means whereby certain of said pairs of coils may be rendered effective and certain other of said pairs of coils may be rendered ineffective.

13. In a flaw detector mechanism for electrical conductors, means for establishing an electromagnetic field around the conductor, a plurality of pairs of detector coils adapted to be moved over said conductor, said pairs of coils being arranged in staggered relation to coact principally with the respective sides of the conductor, and means whereby the pair of coils at one side may be rendered effective and the pair of coils at the other side may be rendered ineffective.

14. In a flaw detector mechanism for electrical conductors, means for establishing an electromagnetic field around the conductor, a plurality of pairs of detector coils adapted to be moved over said conductor, said pairs of coils being arranged in staggered relation to coact with various portions of said conductor, means whereby the output from the pairs of coils are joined together, and a switch in the circuit of each pair of coils in advance of said last-named means whereby the respective pair of coils may be rendered effective and ineffective.

HARCOURT C. DRAKE.